United States Patent
Davis

(10) Patent No.: US 8,441,577 B2
(45) Date of Patent: May 14, 2013

(54) APPARATUS, SYSTEMS AND METHODS FOR SYNCHRONIZATION OF A VIDEO STREAM AND AN AUDIO STREAM

(75) Inventor: Gregory Davis, Covington, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 214 days.

(21) Appl. No.: 13/023,014

(22) Filed: Feb. 8, 2011

(65) Prior Publication Data

US 2012/0200773 A1 Aug. 9, 2012

(51) Int. Cl.
*H04N 9/475* (2006.01)

(52) U.S. Cl.
USPC .......................................... 348/515; 348/512

(58) Field of Classification Search .................. 348/515, 348/512–513, 518–519, 192, 180; *H04N 9/475*
See application file for complete search history.

(56) References Cited

U.S. PATENT DOCUMENTS

| | | | |
|---|---|---|---|
| 6,906,755 B2 * | 6/2005 | Lundblad et al. ............. | 348/515 |
| 7,511,763 B2 * | 3/2009 | Sasaki ........................... | 348/515 |
| 7,809,452 B2 * | 10/2010 | Logvinov et al. ............... | 700/94 |
| 8,208,069 B2 * | 6/2012 | Suzuki ........................... | 348/515 |
| 2003/0179317 A1 * | 9/2003 | Sigworth ....................... | 348/515 |

* cited by examiner

Primary Examiner — Trang U Tran
(74) Attorney, Agent, or Firm — Lowe Graham Jones PLLC

(57) ABSTRACT

Systems and methods are operable to synchronize presentation between video streams and separately received audio streams. An exemplary embodiment receives a first media content stream at a media device, wherein the first media content stream comprises at least a video stream portion; receives a second media content stream at the media device, wherein the second media content stream comprises at least an audio stream portion; delays the audio stream portion of the second media content stream by a duration corresponding to at least one synchronization time delay; communicates the video stream portion of the first media content stream to a visual display device; and communicates the delayed audio stream portion of the second media content stream to an audio presentation device, wherein a visual scene of the video stream portion of the first media content stream is substantially synchronized with sounds of the audio stream portion of the second media content stream.

20 Claims, 2 Drawing Sheets

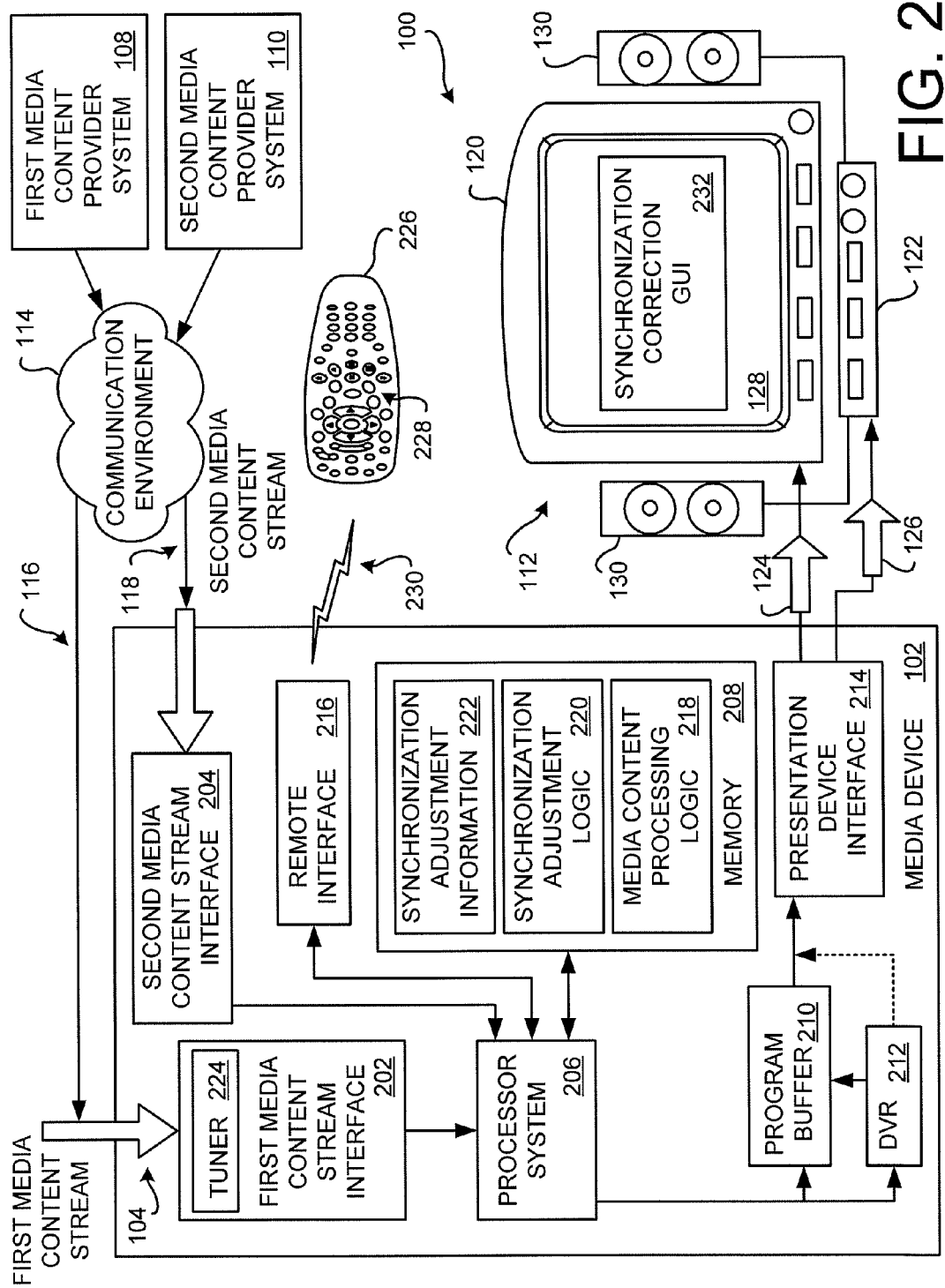

APPARATUS, SYSTEMS AND METHODS FOR SYNCHRONIZATION OF A VIDEO STREAM AND AN AUDIO STREAM

BACKGROUND

Media devices, such as a set top box, are configured to receive media content. The received media content may be presented on a media presentation device, such as a television, a computer system, a monitor, or the like. The media content, such as a broadcast sports event or the like, is received in the form of a media content stream with at least a video stream portion and an associated audio stream portion. The media content stream is produced by a first media content producer.

For example, the first media content producer may be producing a media content stream pertaining to a sports event. The video stream may present the various plays of the sports event. The audio stream may present sounds made during the sports event, such as shouts made by the players and/or applause by the crowd. Also, one or more sportscasters employed by the media content producer may be contributing to the audio stream of the broadcasted sports event.

The video stream portion and the audio stream portion are temporally synchronized with each other during presentation. Once received and processed by the media device, the video stream is presented on a display and the audio stream is output from one or more speakers in a synchronized fashion.

However, a second media content producer may also be presenting their own media content pertaining to the sports event. For example, a local radio station may have one of its own sportscasters at the sports event and may be providing an audio-only radio broadcast pertaining to the sports event. Although there is no video provided by the second media content producer, many users may wish to hear the audio-only broadcast provided by the second media content producer because their sportscaster may be more familiar with team players, team trivia, team and player statistics, team and player histories, and local issues pertaining to the team and/or players. Accordingly, some users will prefer to view the video produced by the first media content producer and listen to the audio produced by the second media content producer.

However, there may be a time delay associated with delivery and presentation of the video stream and the attendant audio stream from the first media content producer. For example, the video stream (and its attendant video stream) may be broadcast to the user via a broadcast system that imparts one or more seconds of time delay between real time play at the sports event and the presentation time by the media device. This delay may be due to inherent processing time delays of the broadcasting system components, broadcasting delays for signal processing and propagation, and/or intentionally induced time delays.

In contrast, the audio-only stream of the second media content producer may be more quickly transmitted to a radio and/or the media device. The processing of the audio-only information may occur very rapidly since the amount of audio-only data is significantly less than the video stream and the associated audio stream that is produced by the first media content producer, and could therefore be broadcast with less of a time delay. Further, the audio-only stream is broadcast over the air using a radio frequency (RF) medium such that the shorter transmission distance may result in less of a time delay. Further, less time delay is required at the media device itself to process the audio-only video stream.

In situations where the user views the video stream produced by the first media content producer, and concurrently listens to the audio-only stream produced by the second media content producer, the user may perceive a noticeable mismatch between the presentation of the video stream and the audio-only stream. Such unsynchronized presentation of the video stream and the audio-only stream may be very distracting to the user.

Unfortunately, the user is not able to correct the unsynchronized presentation of the video and audio-only streams. Accordingly, there is a need in the arts to permit the user to synchronize presentation of the video stream produced by the first media content producer and the audio-only stream produced by the second media content producer.

SUMMARY

Systems and methods synchronizing presentation between video streams and separately received audio streams are disclosed. An exemplary embodiment receives a first media content stream at a media device, wherein the first media content stream comprises at least a video stream portion; receives a second media content stream at the media device, wherein the second media content stream comprises at least an audio stream portion; delays the audio stream portion of the second media content stream by a duration corresponding to at least one synchronization time delay; communicates the video stream portion of the first media content stream to a visual display device; and communicates the delayed audio stream portion of the second media content stream to an audio presentation device, wherein a visual scene of the video stream portion of the first media content stream is substantially synchronized with sounds of the audio stream portion of the second media content stream.

BRIEF DESCRIPTION OF THE DRAWINGS

Preferred and alternative embodiments are described in detail below with reference to the following drawings:

FIG. 2 is a block diagram of an exemplary media device.

DETAILED DESCRIPTION

Figure 1:
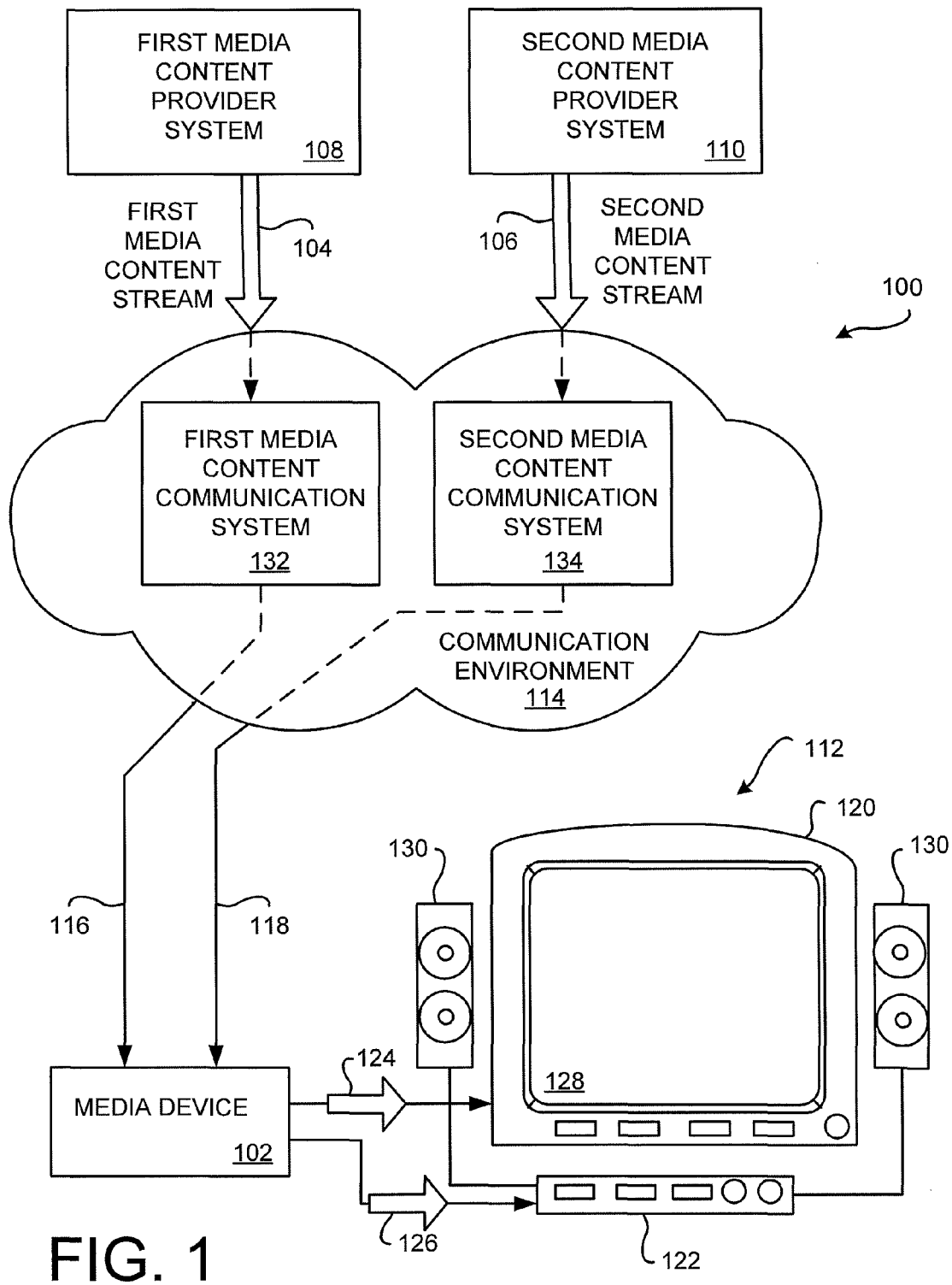
FIG. 1 is a block diagram of an embodiment of a video and audio synchronization system.

FIG. 1 is a block diagram of an embodiment of a video and audio synchronization system 100 implemented in a media device 102, such as, but not limited to, a set top box (STB). Embodiments of the video and audio synchronization system 100 may be implemented in other media devices, such as, but not limited to, stereos, surround-sound receivers, radios, televisions (TVs), digital video disc (DVD) players, digital video recorders (DVRs), game playing devices, or personal computers (PCs) that are configured to generate, provide, and/or to present media content.

Embodiments of the video and audio synchronization system 100 are configured to synchronize presentation of a video stream portion of a first media content stream 104 with a user selected audio stream portion of a second media content stream 106. The video stream portion of the first media content stream 104 is produced by a first media content source 108. The audio stream portion of the second media content stream 106 is produced by a second media content source 110.

Operation of an exemplary embodiment permits the user to concurrently view the video stream portion of the first media content stream 104 produced by the first media content source 108 and to listen to the audio stream portion of the second media content stream 106 produced by the second media content source 110. In the various embodiments, as the video and audio streams are presented on a media presentation system 112, the perceivable actions in the visual scenes of the presented video stream portion are presented substantially in synchronization with sounds of the audio stream portion heard by the user.

For example, but not limited to, a first media content producer may be operating the first media content source 108 to produce video and audio media content pertaining to a sports event or the like. The produced media content is communicated to the media device 102 (as the first media content stream 104) over a communication environment 114. The first media content stream 104 may comprise a video stream portion showing plays of the sports event, and may comprise an audio stream portion providing commentary from one or more sportscasters employed by the first media content producer. The first media content stream 104 is communicated to the media device 102 over a first communication link 116.

Concurrently, a second media content producer may be operating the second media content source 110 to produce media content pertaining to the same sports event. For example, a local radio station may have its own sportscasters at the sports event and may be providing a radio broadcast pertaining to the sports event. The produced audio-only media content is communicated to the media device 102 (as the second media content stream 106) via the communication environment 114. The second media content stream 106 may be received at the media device 102 over a second communication link 118.

At times, the user may choose to view the video stream portion and listen to the audio stream portion of the first media content stream 104 produced by the first media content source 108. At other times, the user may chose to view the video stream portion of the first media content stream 104 and to listen to the audio stream portion of the second media content stream 106 produced by the second media content source 110.

For example, the audio content provided by the second media content producer may be more interesting to the user because the local sportscaster may be more familiar with team players, team trivia, team and player statistics, team and player histories, and local issues pertaining to the team and/or players. As another non-limiting example, the first media content stream 104 may be presenting a commercial or other non-sports event related subject matter that the user is not interested in listening to. Thus, the user may operate the various embodiments so as to listen to sounds of the audio stream portion of the second media content stream 106 while viewing visual scenes of the video stream portion of the first media content stream 104.

Embodiments of the video and audio synchronization system 100 permit the user to selectively change between the audio stream portion of the first media content stream 104 and the audio stream portion of the second media content stream 106. Since presentation of the video stream portion of the first media content stream 104 may be delayed with respect to the audio stream portion of the second media content stream 106, embodiments of the video and audio synchronization system 100 synchronize the video stream portion of the first media content stream 104 with the audio stream portion of the second media content stream 106. Synchronization is effected by introducing a suitable time delay in the presentation of the audio stream portion of the second media content stream 106. Accordingly, the user may concurrently view the video stream portion of the first media content stream 104 and listen to the synchronized audio stream portion of the second media content stream 106.

Embodiments of the media device 102 are configured to selectively communicate portions of, or all of, the first media content stream 104 and the second media content stream 106. The media device 102 processes and conditions the media content streams 104, 106 into a suitable medium and/or format used by the various media devices of the media presentation system 112. The media presentation system 112 may be comprised of a plurality of different media devices, or even a single media presentation device. The exemplary media presentation system 112 comprises a visual display device 120, such as a television (hereafter, generically a TV), and an audio presentation device 122. Non-limiting examples of the visual display device 120 include monitors, personal computers, hand held devices with displays, and other electronic display devices that are configurable to receive and present video information. Non-limiting examples of the audio presentation device 122 include a stereo, a compact disk (CD) player, a radio, a surround-sound receiver, or combinations thereof. Other types of media presentation output devices may also be coupled to the media device 102, including those providing any sort of stimuli sensible by a human being, such as temperature, vibration and the like. In some embodiments, the visual display device 120 and the audio presentation device 122 may be integrated into a single media presentation output device.

In this non-limiting embodiment, the exemplary media device 102 communicates streamed programming content 124 to the visual display device 120. The streamed programming content 124 includes at least the video stream portion of the first media content stream 104, and may optionally include the related audio stream portion of the first media content stream 104. The video stream portion of the streamed programming content 124 is presented on the display 128 of the visual display device 120. In embodiments where the visual display device 120 includes speakers (not shown), the audio stream portion of the streamed programming content 124 may also be presented to the user. For example, but not limited to, the audio stream portion of the streamed programming content 124 (corresponding to the audio stream portion of the first media content stream 104 produced at the first media content source 108) may be presented when the user is not listening to the audio stream portion of the second media content stream 106 (that is produced at the second media content source 110).

Additionally, in this non-limiting embodiment, the media device 102 communicates streamed programming content 126 to the audio presentation device 122. The streamed programming content 126 includes at least the audio stream portion of the streamed programming content 126 (corresponding to the audio stream portion of the second media content stream 106 produced at the second media content source 110). Based on selection by the user, the audio stream portion of the streamed programming content 126 is presented on the speakers 130 of the audio presentation device 122. The various embodiments are configured to mute, or at least adjustably reduce, the output volume of the audio stream portion of the streamed programming content 124 that may be presented to the user by the visual display device 120 when the audio stream portion of the streamed programming content 126 is presented by the audio presentation device 122. That is, the user is able to view the video stream portion of the first media content stream 104 (produced at the first media content source 108) and listen to the audio stream portion of the second media content stream 106 (produced at the second media content source 110).

Embodiments are configured to permit the user to conveniently "toggle" between presentation of the audio stream portion of the streamed programming content 124 (corresponding to the audio stream portion of the first media content stream 104 produced at the first media content source 108) and presentation of the audio stream portion of the streamed programming content 126 (corresponding to the audio stream portion of the second media content stream 106 produced at the second media content source 110).

Further, the media device 102 is configured to store audio setting information associated with the audio stream portion of the streamed programming content 124 and the audio stream portion of the streamed programming content 126. For example, the media device 102 is configured to store information corresponding to the introduced time delay that is used to synchronized the audio stream portion of the second media content stream 106 with the video stream portion of the first media content stream 104. Accordingly, when the user toggles between presentation of the two audio stream portions, synchronism may be automatically maintained without further intervention and/or adjustment by the user. That is, the user and/or the media device 102 are not required to resynchronize each time the user toggles between the two audio stream portions.

Some embodiments may be configured to store information corresponding to the introduced time delay that is used to synchronized the audio stream portions of multiple different second media content streams 106 with the video stream portion of the first media content stream 104. Accordingly, when the user toggles between presentation of the plurality of audio stream portions, synchronism may be automatically maintained without further intervention and/or adjustment by the user. In an exemplary embodiment, a single button on the remote control 226 may be configured to toggle between the audio stream portions in a circular manner.

As another non-limiting example of stored audio setting information, the media device 102 may receive a volume adjustment instruction configured to adjust an output volume of the presented audio stream portions. Embodiments store the corresponding output volume setting information for the two audio stream portions. Accordingly, the user does not need to manually adjust volume each time the user operates the media device 102 to toggle between presentation of the two audio stream portions.

The communication environment 114 may employ a single communication technology and medium. Alternatively, the communication environment 114 may comprise a variety of communication technologies and/or employ a variety of communication mediums. For example, the exemplary communication environment 114 comprises a first communication system 132 and a second communication system 134, each of which employ different communication technologies and/or use different communication mediums. Non-limiting examples of the communication systems 132, 134 include, but are not limited to, a satellite broadcast system that transmits satellite signals received at the media device 102 using a wireless communication medium, an over the air (OTA) system that transmits radio frequency signals to the media device 102 using a RF communication medium, the Internet that may transmit a wireless or wire-based signal to the media device 102 or an intermediate electronic device that is coupled to the media device 102 using a packet-based communication medium, or another wire-based system that transmits wire-based signals to the media device 102 using a suitable wire-based communication medium. For example, the communication systems 132, 134 may employ a coaxial cable and/or fiber optic cable that is coupled to the media device 102.

In one exemplary operating scenario, the first media content stream 104 may be produced for a very large audience dispersed over a very large geographic region. For example, the first media content stream 104 may present a sports event between two professional sporting teams, such as a local sports team and a visiting sports team. The first media content stream 104 may be provided to a national audience and/or to audiences in a foreign country. The first media content producer produces the video stream portion and audio stream portion of the first media content stream 104 at the first media content source 108, and then communicates the produced first media content stream 104 to a first program provider that is operating the first communication system 132. The first program provider processes the first media content stream 104 into a format that is suitable for communication over the first communication system 132. The processed first media content stream 104 is then communicated to a plurality of media devices 102 located over the relatively large geographic region.

In contrast, second media content stream 106 may be produced for a relatively small audience dispersed over a relatively small geographic region that is affiliated with the local sports team. For example, the second media content stream 106 may present the same sports event between the two professional sporting teams using an audio-only broadcast format, such as used by a local radio station. The audio-only second media content stream 106 is produced at the first media content source 108, and is then communicated to the second communication system 134. The second media content stream 106 would broadcast the audio-only second media content stream 106, using a suitable RF medium, via the second communication system 134, to a plurality of local media devices 102 that are within reception range of the broadcasted RF signal.

In another situation, the second media content stream 106 may include a video stream portion, such as when the sports event is produced by a local television broadcasting station. The second media content stream 106 could then be broadcast to the local media devices 102 using a suitable over the air RF signal. Alternatively, or additionally, the second media content stream 106 could be communicated to the media devices 102 using a satellite or wire-based communication system.

In yet other situations, both the first media content stream 104 and the second media content stream 106 may be provided to the plurality of media devices 102 using the same communication system, such as when a satellite distribution company or a cable television company provide both national and local coverage of the sporting event. For example, the video stream portion of the first media content stream 104 produced for national coverage may be more interesting and/or may be of a higher quality than the video stream portion of the second media content stream 106 produced for the local market. On the other hand, the user may prefer to listen to the audio stream portion of the second media content stream 106 that is produced for the local market.

In another exemplary operating scenario, the media device 102 may be receiving, and/or have access to, a plurality of media content streams. That is, in addition to the first media content stream 104 and the second media content stream 106, the media device 102 may have access to other media content streams. Accordingly, the user may pick and choose which video stream portion is presented and which audio stream portion is presented from among the available plurality of media content steams. Embodiments of the video and audio synchronization system 100 store audio setting information for the plurality of media content streams so that the user may change presentation of the video stream portion and the audio stream portion in accordance with their personal preferences.

FIG. 2 is a block diagram of an exemplary media device 102. The non-limiting simplified exemplary media device 102 comprises a first media content stream interface 202, a second media content stream interface 204, a processor system 206, a memory 208, a program buffer 210, an optional digital video recorder (DVR) 212, a presentation device interface 214, and a remote interface 216. The memory 208 comprises portions for storing the media content processing logic 218, the synchronization adjustment logic 220, and the synchronization adjustment information 222. In some embodiments, the media content processing logic 218 and the synchronization adjustment logic 220 may be integrated together, and/or may be integrated with other logic. Other media devices 102 may include some, or may omit some, of the above-described media processing components and/or logic. Further, additional components and/or logic not described herein may be included in alternative embodiments.

The functionality of the media device 102, here a set top box, is now broadly described. The media content processing is generally implemented by the processor system 206 while executing the media content processing logic 218. One or more tuners 224 in the first media content stream interface 202 selectively tune to the first media content stream 104 in accordance with instructions received from the processor system 206. The processor system 206, executing the media content processing logic 218 and based upon a request for a first program of interest specified by the user, parses out the first media content stream 104 into its respective video stream portion and audio stream portion. The first media content stream 104 may be temporarily stored by the program buffer 210 to facilitate the timing of the communication of the video stream portion (and optionally the audio stream portion) of the first media content stream 104 to the media presentation system 112. Similarly, the processor system 206 parses out the second media content stream 106 into its respective video stream portion, if present, and its respective audio stream portion. The video and audio stream portions of the first media content stream 104 and/or the second media content stream 106 may be temporarily stored by the program buffer 210 to facilitate the synchronization of the communication of the video and audio stream portions of the first media content stream 104 and the second media content stream 106 to the media presentation system 112.

Selected ones of the video and audio stream portions of the first media content stream 104 and/or the second media content stream 106 are streamed out to the media presentation system 112 via the presentation device interface 214. Alternatively, or additionally, the first media content stream 104 and/or the second media content stream 106 may be saved into the DVR 212 for later presentation.

In some embodiments, the user may schedule the saving of the first media content stream 104 and/or the second media content stream 106 into the DVR 212. Since the video and audio synchronization system 100 has saved previously determined synchronization corrections, at least the video stream portion of the first media content stream 104 and/or at least the audio stream portion of the second media content stream 106 may be saved into the DVR 212 based upon the previous synchronization correction instruction. The synchronization correction instruction is configured to cause the media device 102 to record at least the audio stream portion of the second media content stream 106 in accordance with the user synchronization correction instruction. An exemplary embodiment may save only the video stream portion of the first media content stream 104 and the synchronized audio stream portion of the second media content stream 106 into the DVR 212. Alternatively, all portions of the first media content stream 104 and the synchronized second media content stream 106 may be saved into the DVR 212.

For example, the user may watch a sports event featuring a local sporting team one weekend, and determine the synchronization time delay for the audio stream portion of the second media content stream 106. The local sporting team is likely playing the next week (thought likely playing a different sporting team). The user may configure their media device 102 to record the upcoming scheduled sporting event. The user may also schedule the recording of the audio stream portion of the second media content stream 106, which may be, for example, local coverage of the sporting event by a local radio station. When the next sporting event is underway, at least the video stream portion of the first media content stream 104 and at least the synchronized audio stream portion of the second media content stream 106 is saved into the DVR 212.

The exemplary media device 102 is configured to receive commands from the user via a remote control 226. The remote control 226 includes one or more controllers 228. The user, by actuating one or more of the controllers 228, causes the remote control 226 to generate and transmit commands, via a wireless signal 230, to the media device 102 and/or the media presentation system 112. The commands control the media device 102 and/or control the components of the media presentation system 112. The wireless signal 230 may be an infrared signal or a radio frequency (RF) signal that is received by the remote interface 216.

Typically, the video and audio stream portions of the first media content stream 104 are closely synchronized during presentation on the media presentation system 112. However, the video and audio stream portions of the first media content stream 104 may not be synchronized to the video and audio stream portions of the second media content stream 106. Generally, the amount or degree of unsynchronization will likely be on the order of a plurality of milliseconds, or even seconds. Accordingly, embodiments of the video and audio synchronization system 100 are configured to permit the user and/or the media device 102 to incrementally delay presentation of the audio stream portion of the second media content stream 106 by a predefined duration (hereafter, generically the synchronization time delay). In response to initiation of a synchronization correction by the user and/or the media device 102, embodiments of the video and audio synchronization system 100 delay presentation of the audio stream portion of the second media content stream 106 by the predefined duration of the synchronization time delay.

The duration of the synchronization time delay may be determined in a variety of manners. An exemplary embodiment may be configured to receive one or more user specifications that are used to determine the duration of the synchronization time delay. Alternatively, or additionally, the media device 102 may compare the audio stream portions of the first media content stream 104 and the second media content stream 106, and then automatically determine the synchronization time delay, or at least a portion thereof. Alternatively, or additionally, information specifying the duration of one or more incremental synchronization time delays may be communicated to the media device 102 in the first media content stream 104, the second media content stream 106, or another signal that defines the synchronization time delay, or at least a portion thereof.

In an exemplary embodiment, the user may effect a delay in the presentation of the audio stream portion of the second media content stream 106 by generating a synchronization correction instruction that is communicated to the media device 102 (or other component of the media presentation system 112 having an embodiment of the video and audio synchronization system 100 therein). The synchronization correction instruction may be generated by the remote control 226 or another user interface (not shown). The synchronization correction instruction is configured to cause the media device 102 to delay presentation of the audio stream portion of the second media content stream 106 in accordance with the user synchronization correction instruction.

In an exemplary embodiment, the duration of a manual synchronization time delay associated with the synchronization correction instruction generated by the user may be a predefined amount of time (hereafter, generically an incremental synchronization time delay). The duration of the manual incremental synchronization time delay may be stored in the synchronization adjustment information 222 region of the memory 208.

For example, the predefined duration of the manual incremental synchronization time delay may be ten milliseconds. Each time the synchronization correction instruction is received, the media device 102 incrementally delays presentation of the audio stream portion of the second media content stream 106 by ten milliseconds. After receiving a plurality of synchronization correction instructions, the user may become satisfied with the degree of synchronization between the video stream portion of the first media content stream 104 and the audio stream portion of the second media content stream 106.

In an exemplary embodiment, one or more of the controllers 228 of the remote control 226 are configured to generate the synchronization correction instruction. The processor system 206, executing the synchronization adjustment logic 220, causes a delay corresponding to the incremental manual synchronization time delay in the communication of the audio stream portion of the second media content stream 106 from the presentation device interface 214 out to the components of the media presentation system 112.

Some embodiments may be configured to employ a plurality of predefined manual incremental synchronization time delays having different durations. For example, a first manual incremental synchronization time delay may correspond to a one second delay. A second manual synchronization time delay may correspond to a half second. A third manual synchronization time delay may correspond to one hundred milliseconds. A fourth manual synchronization time delay may correspond to ten milliseconds. In an exemplary embodiment, individual controllers 228 on the remote control 226 may each be configured to generate a synchronization correction instruction with a particular one of the manual synchronization time delays.

For example, the user may specify a one second manual incremental synchronization time delay that delays presentation of the audio stream portion of the second media content stream 106 by one second. If the user is not satisfied with the degree of synchronization, the user may next specify a second synchronization correction instruction that delays presentation of the audio stream portion of the second media content stream 106 by a second manual synchronization time delay. The process continues until the user is satisfied with the degree of synchronization between the presented video stream portion of the first media content stream 104 and the presented audio stream portion of the second media content stream 106.

Further, in some embodiments, the user may specify one or more manual time synchronization time delays that advance presentation of the audio stream portion of the second media content stream 106. Accordingly, if a user causes the media device 102 to overcorrect the incremental synchronization time delay such that the audio stream portion of the second media content stream 106 is presented ahead of the first media content stream 104, the user may cause the media device to advance presentation of the audio stream portion of the second media content stream 106 by the duration of a manual synchronization time delay. Accordingly, the total duration of the incremental synchronization time delay can be decreased.

Embodiments are configured to store the total duration of the manual synchronization time delays in the synchronization adjustment information 222 region of memory 208. The amounts of the durations changes may be buffered, stored or otherwise tracked so that when the user is satisfied with the degree of synchronization, the total duration is stored. Thus, when the user toggles between presentation of the audio stream portion of the first media content stream 104 and the audio stream portion of the second media content stream 106, synchronization between the presented video stream portion of the first media content stream 104 and the presented audio stream portion of the second media content stream 106 is automatically maintained by the media device 102.

Any suitable duration of the one or more manual synchronization time delays may be used. In an exemplary embodiment, the user may specify the duration synchronization time delay which is stored for later use. Alternatively, the media device 102 may be initially configured with a predefined manual synchronization time delay, or may receive the duration of the manual synchronization time delay in the first media content stream 104, the second media content stream 106, or another signal. Further, any number of incremental manual synchronization time delays may be used, and in some embodiments, the duration and/or number of manual synchronization time delays may be adjustable by the user and/or the media device 102.

Alternatively, or additionally, the user may operate the remote control 226 (or controllers on the media device 102 or other device) to cause presentation of a synchronization correction graphical user interface (GUI) 232 on the display 128 of the visual display device 120. For example, the synchronization correction GUI 232 may be presented on the display 128 of the visual display device 120. In an exemplary embodiment, the synchronization correction GUI 232 has the look and feel of a table or the like presenting information describing available synchronization correction options. The synchronization correction GUI 232 is interactive with the user. The user, via their remote control 226 or controllers on the media device 102, is able to "scroll" or "navigate" about the synchronization correction GUI 232 to select and/or to specify a manual synchronization time delay of interest. When the user highlights a portion of the synchronization correction GUI 232 corresponding to a manual synchronization time delay of interest, the user may actuate one or more controllers 228 to cause the media device 102 (or other components of the media presentation system 112 configured with embodiments of the video and audio synchronization system 100) to perform the synchronization correction.

In some embodiments, the media device 102 may compare the audio stream portions of the first media content stream 104 and the second media content stream 106, and automatically determine an automatic synchronization time delay. Further, the media device 102 may automatically effect the automatic synchronization time delay to synchronize the video stream portion of the first media content stream 104 and the audio stream portion of the second media content stream 106. The user may then manually implement finer adjustments in the synchronization if the user is not satisfied by the synchronization effected by the automatic synchronization time delay.

In an exemplary embodiment, the synchronization adjustment logic 220 includes logic that is configured to monitor the audio stream portion of the first media content stream 104 and the second media content stream 106. When a uniquely identifiable sound is received in both audio stream portions, the video and audio synchronization system 100 determines a temporal separation between the identifiable unique sound. For example, a horn or other sound device may emit a loud discernable sound at the sports event that is identifiable by the synchronization adjustment logic 220 that includes suitable sound recognition logic. Then, a comparison in real time is made to identify the real time separation in the identified unique sound in the audio stream portion of the first media content stream 104 and the audio stream portion of the second media content stream 106. The duration of the real time separation corresponds to the automatic synchronization time delay. Accordingly, the determined duration may be used to synchronize the video stream portion of the first media content stream 104 and the audio stream portion of the second media content stream 106. In some embodiments, the determined duration between the unique sound in the audio stream portions of the first media content stream 104 and the second media content stream 106 is saved as audio setting information for later resynchronization.

Alternatively, or additionally, where both the first media content stream 104 and the second media content stream 106 include video stream portions, the synchronization adjustment logic 220 may include logic that is configured to monitor the video stream portions of the first media content stream 104 and the second media content stream 106. The object recognition logic is configured to identify a unique image characteristic associated with the sports event. For example, a score or the like may be discernable in the video stream portion of the first media content stream 104 and the second media content stream 106. The synchronization adjustment logic 220, employing object recognition logic, identifies the unique object in the video stream portions of the first media content stream 104 and the second media content stream 106. Then, a comparison in real time is made to identify the real time separation in the presentation of the identified unique object. The duration of the real time separation in the discernible object corresponds to the automatic synchronization time delay.

Alternatively, or additionally, information specifying the duration of one or more automatic synchronization time delays may be communicated to the media device 102 in the first media content stream 104, the second media content stream 106, or another signal that defines the synchronization time delay, or at least a portion thereof. For example, both of the first media content stream 104 and the second media content stream 106 may be communicated to the media device 102 via a common media content communication system. The operator of the common media content communication system may monitor the first media content stream 104 and the second media content stream 106 to determine a suitable automatic synchronization time delay. The determined automatic synchronization time delay may then by communicated to the media device 102.

In some embodiments, one or more of a plurality of media devices 102 may include a backchannel connection to another entity. As the users adjust their respective media devices 102, the final synchronization time delays may be communicated back to the entity. Then, the entity may determine a suitable automatic synchronization time delay based upon the received final synchronization time delays, and then communicate the determined automatic synchronization time delay to other media devices 102.

Embodiments of the video and audio synchronization system 100 may delay presentation of the audio stream portion of the second media content stream 106 using one or more techniques. In an exemplary embodiment, the synchronization adjustment logic 220 is retrieved and executed by the processor system 206 in cooperation with the media content processing logic 218. An exemplary embodiment may use time shifting and/or pitch shifting to adjust the audio stream portion of the second media content stream 106 by the duration of the synchronization time delay. Any suitable technique may be used to adjust the audio stream portion of the second media content stream 106. Time compression or expansion may be used. A suitable phase vocoder method may be used. A suitable Fourier transform method may be used. A suitable time domain harmonic scaling method may be used. A suitable resampling process may be used. An adaptive basis transform algorithm may be used.

Some embodiments of the media device 102 may integrate the first media content stream interface 202 and the second media content stream interface 204. For example, the media device 102 may comprise two or more tuners 224. During operation, the media device 102 may use a first tuner 224 to receive the video stream portion of the first media content stream 104. The media device 102 may use a second tuner 224 to receive at least the audio stream portion of the second media content stream 106. The two or more tuners 224 may be coupled to a common media content communication system.

Alternatively, or additionally, embodiments of the media device 102 may employ separate devices that correspond to the first media content stream interface 202 and the second media content stream interface 204. For example, the first media content stream interface 202 may provide connectivity to a cable or satellite media content communication system. The second media content stream interface 204 may include a RF receiver that is configured to receive RF signals, such as when the sporting event is locally broadcast as a television RF signal or a radio show RF signal.

Alternatively, or additionally, embodiments of the media device 102 may be configured to couple to an intermediary device (not shown) that is configured to receive the second media content stream 106. For example, the intermediary device may be a radio or other RF tuner that is configured to receive broadcast radio show RF signals and/or satellite radio show signals. The RF signal received by the intermediary device is communicated to the media device 102. The media device 102 may then synchronize presentation of the video stream portion of the first media content stream 104 and the audio stream portion of the second media content stream 106.

As another non-limiting example, the intermediary device may be a personal computer or other electronic device configured to connect to the Internet. The second media content stream 106 received by the intermediary device over the Internet is communicated to the media device 102. The media device 102 may then synchronize presentation of the video stream portion of the first media content stream 104 and the audio stream portion of the second media content stream 106.

Embodiments of the media device 102 may be configured to communicatively couple to components of the media presentation system 112 in a variety of manners. The configurations depend upon the capabilities of the media device 102 and/or upon user preferences. The exemplary media presentation system 112 of FIG. 2 includes the visual display device 120 (generically a TV) and a separate audio presentation device 122, such as a surround-sound receiver system with the speakers 130.

In one exemplary configuration, the media device 102 may be configured to communicate the video stream portion and the audio stream portion of the first media content stream 104 to the visual display device 120, and to separately communicate the audio stream portion of the second media content stream 106 to the audio presentation device 122. In this embodiment, when the user operates the media device 102 to present the audio stream portion of the first media content stream 104, the media device 102 does not communicate the audio stream portion of the second media content stream 106 to the audio presentation device 122. In another embodiment, the media device 102 may mute or reduce the volume of the audio stream portion of the second media content stream 106 communicated to the audio presentation device 122. Alternatively, the media device 102 may communicate a mute or volume reduction signal to the audio presentation device 122.

When the user operates the media device 102 to present the audio stream portion of the second media content stream 106, the media device 102 does not communicate the audio stream portion of the first media content stream 104 to the visual display device 120. In another embodiment, the media device 102 may mute or reduce the volume of the audio stream portion of the first media content stream 104. Alternatively, the media device 102 may communicate a mute or volume reduction signal to the visual display device 120.

In another configuration, the media device 102 may be configured to communicate the video stream portion and the audio stream portion of the first media content stream 104 to the visual display device 120, and to communicate the audio stream portions of both the first media content stream 104 and the second media content stream 106 to the audio presentation device 122. In this embodiment, when the user operates the media device 102 to present the audio stream portion of the first media content stream 104, the media device 102 does not communicate the audio stream portion of the second media content stream 106 to the visual display device 120 and the audio presentation device 122. When the user operates the media device 102 to present the audio stream portion of the second media content stream 106, the media device 102 does not communicate the audio stream portion of the first media content stream 104 to the visual display device 120 and the audio presentation device 122.

In another exemplary configuration, the media presentation system 112 may have a single presentation device, such as a TV that has both the display 128 and speakers (not shown). In this configuration, the media device 102 may be configured to communicate the video stream portion of the first media content stream 104 to the visual display device 120, and to communicate either the audio stream portion of the first media content stream 104 or the audio stream portion of the second media content stream 106 to the visual display device 120. In this embodiment, when the user operates the media device 102 to present the audio stream portion of the first media content stream 104, the media device 102 does not communicate the audio stream portion of the second media content stream 106 to the audio presentation device 122. When the user operates the media device 102 to present the audio stream portion of the second media content stream 106, the media device 102 does not communicate the audio stream portion of the first media content stream 104 to the audio presentation device 122.

It should be emphasized that the above-described embodiments of the video and audio synchronization system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media content synchronization method, comprising:
    receiving a first media content stream at a media device, wherein the first media content stream comprises at least a video stream portion;
    receiving a second media content stream at the media device, wherein the second media content stream comprises at least an audio stream portion;
    receiving an automatic synchronization time delay determined by a remote source, where a duration of the automatic synchronization time delay is determined by a remote device based upon a plurality of durations of synchronization time delays determined by a plurality of other remote media devices that communicate their respective durations of synchronization time delays to the remote device in response to synchronization of the video stream portion of the first media content stream with the audio stream portion of the second media content stream when presented at the respective one of the plurality of other remote media devices;
    delaying the audio stream portion of the second media content stream by a duration corresponding to at least one synchronization time delay;
    communicating the video stream portion of the first media content stream to a visual display device; and
    communicating the delayed audio stream portion of the second media content stream to an audio presentation device,
    wherein a visual scene of the video stream portion of the first media content stream is substantially synchronized with sounds of the audio stream portion of the second media content stream based on the duration of the received automatic synchronization time delay.

2. The method of claim 1, further comprising:
    receiving a user initiated synchronization correction instruction, wherein the synchronization correction instruction comprises at least the duration of a user initiated synchronization time delay,
    wherein a total duration of synchronization time delay is a sum of the user initiated synchronization time delay and the automatic synchronization time delay, and
    wherein the visual scene of the video stream portion of the first media content stream is substantially synchronized with sounds of the audio stream portion of the second media content stream based on the total duration.

3. The method of claim 2, wherein the synchronization correction instruction is a first synchronization correction instruction that includes a first synchronization time delay, and further comprising:
    receiving a second user initiated synchronization correction instruction, wherein the second synchronization correction instruction comprises at least a duration of a second synchronization time delay,
    wherein the audio stream portion of the second media content stream is delayed by a sum of the durations of the first synchronization time delay and the second synchronization time delay.

4. The method of claim 1, further comprising:
    storing the duration of the received automatic synchronization time delay in a memory of the media device, wherein in response to a user operating the media device to present the video stream portion of the first media content stream with the audio stream portion of the second media content stream, the stored duration of the received automatic synchronization time delay is retrieved so that the visual scene of the video stream portion of the first media content stream is substantially synchronized with sounds of the audio stream portion of the second media content stream.

5. The method of claim 4, further comprising:
receiving a first user initiated request to present the audio stream portion of the first media content stream;
communicating the audio stream portion of the first media content stream to the audio presentation device concurrently with communicating the video stream portion of the first media content stream to the visual display device;
subsequently receiving a second user initiated request to present the audio stream portion of the second media content stream;
retrieving the duration of the synchronization time delay from the memory; and
concurrently communicating the audio stream portion of the second media content stream to the audio presentation device and the video stream portion of the first media content stream to the visual display device,
wherein the audio stream portion of the second media content stream is delayed by the retrieved duration of the synchronization time delay.

6. The method of claim 4, wherein storing the duration of the synchronization time delay in the memory of the media device comprises:
receiving the automatic synchronization time delay determined from the remote source, wherein the duration of the automatic synchronization time delay is based upon durations of synchronization time delays determined by a plurality of remote media devices.

7. The method of claim 1, wherein receiving the first and the second media content streams at the media device comprises:
receiving the first media content stream from a first media content communication system; and
receiving the second media content stream from a second media content communication system,
wherein a first communication medium used by the first media content communication system is different from a second communication medium used by the second media content communication system.

8. The method of claim 7, wherein the second communication medium used by the second media content communication system is a radio frequency (RF) communication medium that communicates an audio-only media content stream.

9. The method of claim 1, wherein the first media content stream further comprises at least an audio stream portion, the method further comprising:
identifying at the media device a first unique sound in the audio stream portion of the first media content stream;
identifying at the media device a second unique sound in the audio stream portion of the second media content stream, wherein the second unique sound is the same as the first unique sound;
determining at the media device a difference in time between the first unique sound identified in the first media content stream and the second unique sound identified in the second media content stream;
determining at the media device the duration of a synchronization time delay based upon the determined time difference between the identified first unique sound and the identified second unique sound; and concurrently communicating the audio stream portion of the second media content stream to the audio presentation device and the video stream portion of the first media content stream to the visual display device,
wherein the audio stream portion of the second media content stream is delayed by the determined duration of the synchronization time delay.

10. The method of claim 1, further comprising:
muting an audio stream portion of the first media content stream during communication of the audio stream portion of the second media content stream.

11. The method of claim 2, further comprising:
communicating the total duration of the synchronization time delay to the remote device, wherein a new automatic synchronization time delay is determined by the remote device using the communicated total duration.

12. A media content synchronization method, comprising:
receiving a first media content stream at a media device, wherein the first media content stream comprises at least a video stream portion;
receiving a second media content stream at the media device, wherein the second media content stream comprises at least an audio stream portion;
receiving an automatic synchronization time delay determined from a remote source, where a duration of the automatic synchronization time delay is based upon durations of synchronization time delays determined by a plurality of remote media devices;
storing the duration of the automatic synchronization time delay in a memory of the media device;
delaying the audio stream portion of the second media content stream by a duration corresponding to at least one synchronization time delay;
communicating the video stream portion of the first media content stream to a visual display device;
communicating the delayed audio stream portion of the second media content stream to an audio presentation device, wherein a visual scene of the video stream portion of the first media content stream is substantially synchronized with sounds of the audio stream portion of the second media content stream;
receiving a user initiated synchronization correction instruction initiated, wherein the synchronization correction instruction comprises at least a duration of a manual synchronization time delay;
adding the duration of the automatic synchronization time delay and the duration of the manual synchronization time delay; and
concurrently communicating the audio stream portion of the second media content stream to the audio presentation device and the video stream portion of the first media content stream to the visual display device,
wherein the audio stream portion of the second media content stream is delayed by the added durations.

13. The method of claim 12, further comprising:
storing the added durations of the automatic synchronization time delay and the manual synchronization time delay in the memory.

14. The method of claim 12, further comprising:
receiving a user initiated volume adjustment instruction, wherein the volume adjustment instruction is configured to adjust an output volume of the audio stream portion of the second media content stream; and
storing volume level information corresponding to the adjusted output volume of the audio stream portion of the second media content stream, wherein the output volume of the communicated audio stream portion of the second media content stream is adjusted in accordance with the stored volume level information when the audio stream portion of the second media content stream is concurrently communicated with the video stream portion of the first media content stream.

15. A media device, comprising:
a first media content stream interface configured to communicatively couple the media device to a first media content communication system, and configured to receive a first media content stream comprising a first video stream portion and a first audio stream portion;
a second media content stream interface configured to communicatively couple the media device to a second media content communication system, and configured to receive a second media content stream comprising at least a second audio stream portion;
a memory configured to store a duration of a synchronization time delay; and
a processor system communicatively coupled to the first media content stream interface, the second media content stream interface, and the memory, and
wherein the processor system is configured to:
identify a unique sound in the first audio stream portion of the first media content stream;
identify the unique sound in the second audio stream portion of the second media content stream, wherein the unique sound identified in the second audio stream portion is the same as the unique sound identified in the first audio stream portion;
determine a difference in time between the unique sound identified in the first audio stream portion of the first media content stream and the unique sound identified in the second audio stream portion of the second media content stream;
determine the duration of the synchronization time delay based upon the determined time difference between the unique sound identified in the first audio stream portion of the first media content stream and the unique sound identified in the second audio stream portion of the second media content stream;
communicate the first video stream portion of the first media content stream to a visual display device; and
delay communication of the second audio stream portion of the second media content stream by the duration of the synchronization time delay to an audio presentation device,
wherein a visual scene of the video stream portion of the first media content stream is substantially synchronized with sounds of the audio stream portion of the second media content stream based upon the determined duration.

16. The media device of claim 15,
wherein the first media content stream interface is configured to receive the first media content stream that is communicated using a first communication medium,
wherein the second media content stream interface is configured to receive the second media content stream that is communicated using a second communication medium, and
wherein the first communication medium is different from the second communication medium.

17. The media device of claim 15, wherein the first media content stream interface and the second media content stream interface are integrated into a single interface, wherein the first media content communication system and the second media content communication system are the same media content communication system, and wherein the single interface comprises:
a first tuner configured to receive the first media content stream; and
a second tuner configured to receive the second media content stream.

18. The media device of claim 15, further comprising:
a remote interface configured to receive a synchronization correction instruction emitted from a remote control, wherein the synchronization correction instruction comprises at least the duration of the synchronization time delay.

19. A media content synchronization method, the method comprising:
communicating a video stream portion of a first media content stream to a visual display device;
communicating an audio stream portion of a second media content stream to an audio presentation device;
receiving a user initiated synchronization correction instruction, wherein the synchronization correction instruction comprises at least a duration of a manual synchronization time delay;
delaying communication of the audio stream portion of the second media content stream by the duration of the manual synchronization time delay, wherein a visual scene of the video stream portion of the first media content stream is substantially synchronized with sounds of the delayed audio stream portion of the second media content stream;
receiving a user initiated volume adjustment instruction initiated, wherein the volume instruction is configured to adjust an output volume of the audio stream portion of the second media content stream; and
storing volume level information corresponding to the adjusted output volume of the audio stream portion of the second media content stream,
wherein the output volume of the communicated audio stream portion of the second media content stream is adjusted in accordance with the stored volume level information when the audio stream portion of the second media content stream is concurrently communicated with the video stream portion of the first media content stream.

20. The synchronization method of claim 19, further comprising:
muting an audio stream portion of the first media content stream during communication of the delayed audio stream portion of the second media content stream.

* * * * *